United States Patent
Poloniewicz

(10) Patent No.: US 7,007,843 B2
(45) Date of Patent: Mar. 7, 2006

(54) LIGHT BEAM SHAPING ARRANGEMENT AND METHOD IN ELECTRO-OPTICAL READERS

(75) Inventor: Paul R. Poloniewicz, Coral Springs, FL (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/457,302

(22) Filed: Jun. 9, 2003

(65) Prior Publication Data

US 2004/0245338 A1    Dec. 9, 2004

(51) Int. Cl.
*G06K 7/10* (2006.01)

(52) U.S. Cl. ............. 235/454; 235/462.36; 235/462.37

(58) Field of Classification Search ................ 235/454, 235/462.14, 462.2, 462.21, 462.24, 462.36, 235/462.37, 470, 472.01; 359/224, 291, 359/223

See application file for complete search history.

(56) References Cited

U.S. PATENT DOCUMENTS

| | | | | |
|---|---|---|---|---|
| 4,441,791 | A * | 4/1984 | Hornbeck | 359/295 |
| 5,629,790 | A * | 5/1997 | Neukermans et al. | 359/198 |
| 5,748,172 | A * | 5/1998 | Song et al. | 345/111 |
| 5,867,302 | A * | 2/1999 | Fleming | 359/291 |
| 6,028,689 | A * | 2/2000 | Michalicek et al. | 359/224 |
| 6,661,561 | B1 * | 12/2003 | Fitzpatrick et al. | 359/291 |
| 6,717,715 | B1 * | 4/2004 | Holl et al. | 359/291 |
| 6,771,855 | B1 * | 8/2004 | Pezeshki et al. | 385/31 |
| 6,798,114 | B1 * | 9/2004 | Miller et al. | 310/311 |
| 2003/0049879 | A1 * | 3/2003 | Lin | 438/52 |
| 2004/0160887 | A1 * | 8/2004 | Ma et al. | 369/112.29 |

* cited by examiner

Primary Examiner—Steven S. Paik

(57) ABSTRACT

A micro-electro-mechanical system component is deformed to control a shape and size and orientation of a laser beam spot that is scanned across a symbol to be read by an electro-optical reader.

20 Claims, 4 Drawing Sheets

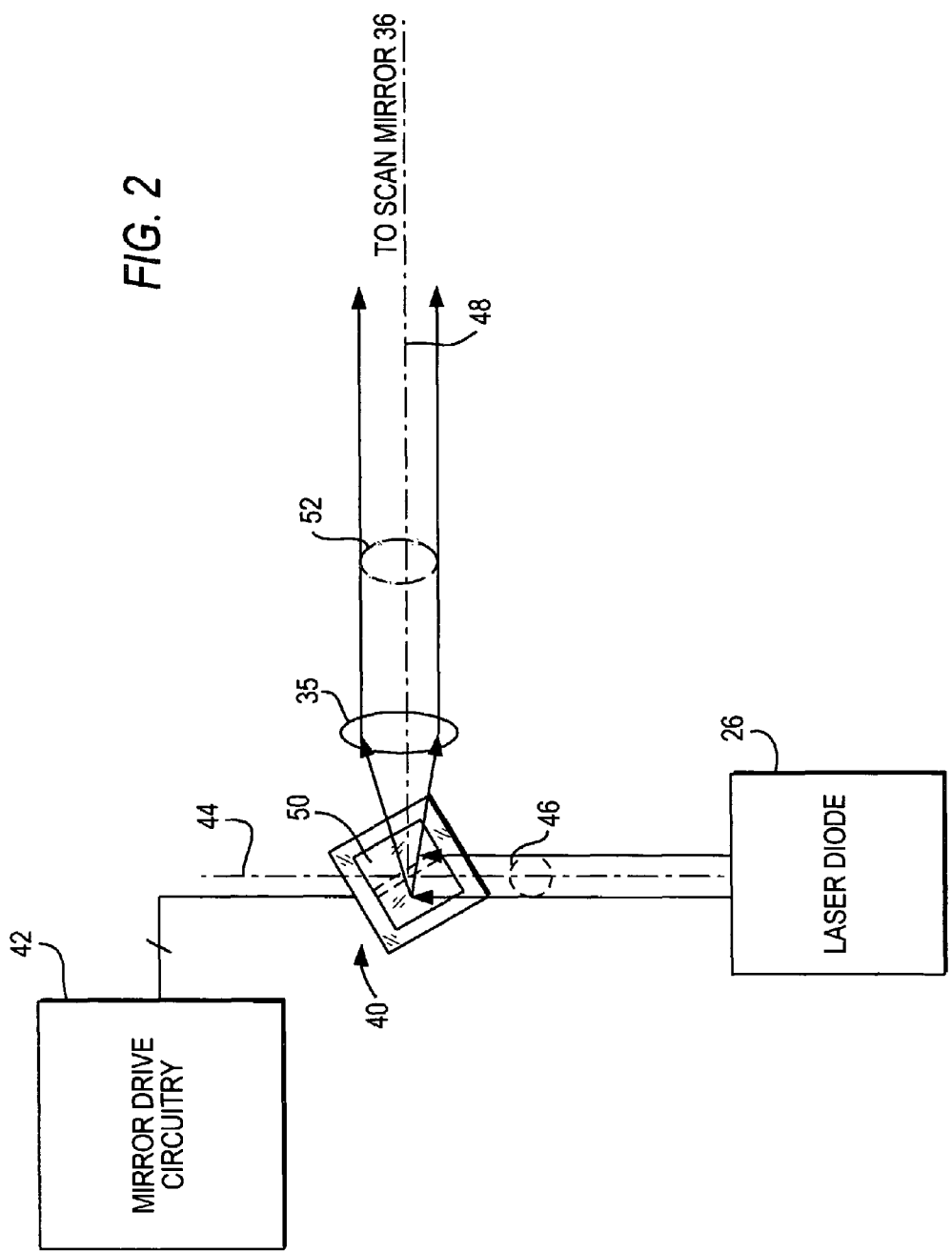

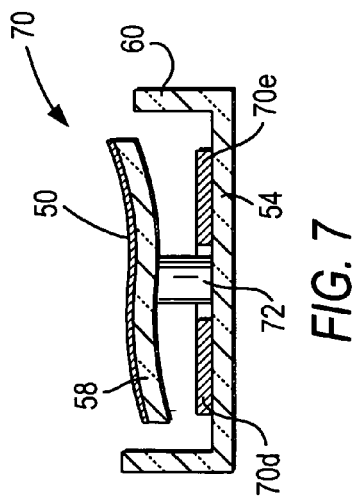
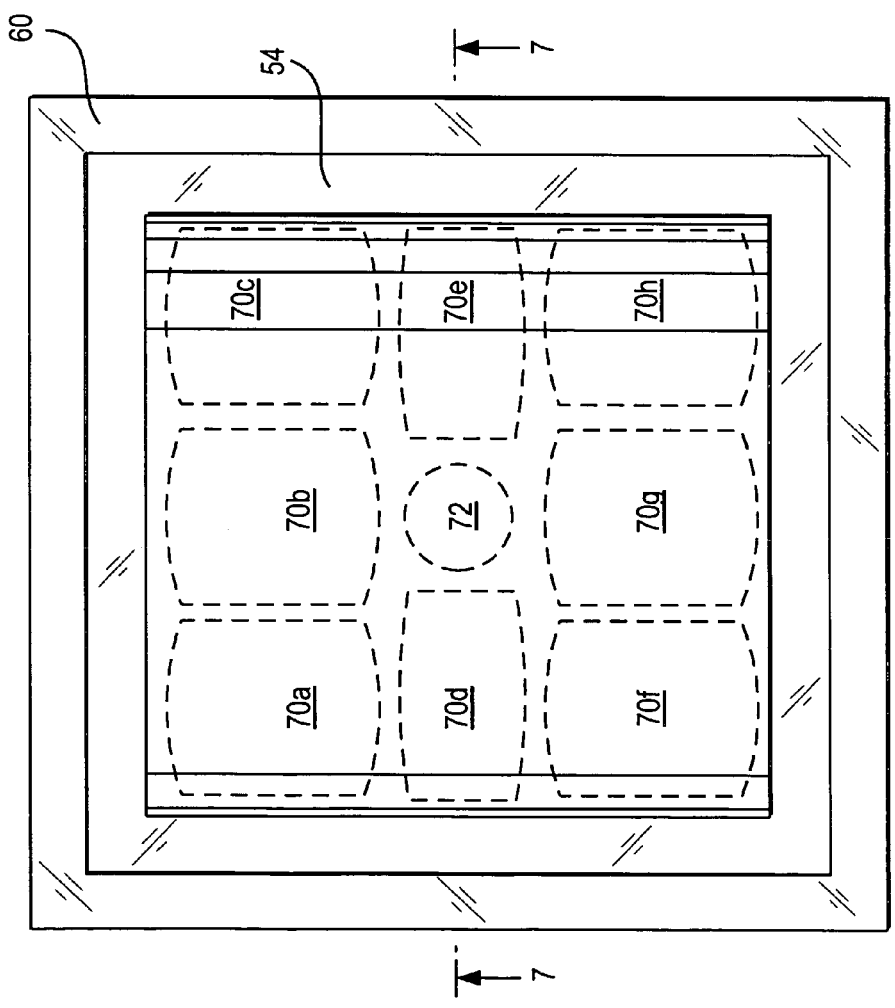

LIGHT BEAM SHAPING ARRANGEMENT AND METHOD IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, controlling a size and shape and orientation of a laser beam spot that scans a symbol during symbol reading.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. Nos. 4,251,798; No. 4,369,361; No. 4,387,297; No. 4,409,470, No. 4,760,248 and No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a predetermined target location. Preferably, the cross-section of the beam spot at the target location approximates the minimum width between symbol regions of different light reflectivity, i.e., the bars and spaces.

In conventional readers, the light beam is directed by a scanning component along a light path toward a target symbol. The reader operates by repetitively scanning the light beam in a scan pattern, for example, a line or a series of lines across the target symbol by movement of the scanning component such as a mirror disposed in the path of the light beam. The scanning component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

Overall performance of the reader for reading symbols is a function of the optical components which direct the light beam at the target symbol and which resolve the reflected light, and a function of the electronic components which convert and process the information contained in the reflected light. A measure of the overall performance of the reader is its ability to resolve the narrowest elements of the symbol and its ability to decode symbols located both close in and far away from the reader.

The scan pattern that scans the symbol can take a variety of forms, such as repeated line scan, standard raster scan, jittered raster scan, fishbone, petal, etc. These beam patterns are generated by controlled motions of one or more scan components in the beam path. Typically, the scan component includes a mirror that is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a symbol can be scanned in a given time period, the chances of obtaining a valid read of the symbol are increased. This is particularly important when the symbols are borne by moving objects, such as packages traveling on a conveyor belt.

Many applications call for a hand-held reader where a user aims the light beam at the symbol, and the beam executes a scan pattern to read the symbol. For such applications, the arrangement of electro-optical components must be compact in order to be accommodated in a hand-held package which may be pistol-shaped. Moreover, such readers must be lightweight and structurally robust to withstand physical shock resulting from rough handling. It is also desirable that minimal power be consumed during operation to promote battery usage.

For reading a one-dimensional symbol, or for reading a poorly printed symbol, or a symbol printed with a low contrast against its background, it is desirable to form the beam spot with an elliptical or ovoidal cross-section with the smaller dimension of the spot extending lengthwise along the symbol along the scan direction. For reading a two-dimensional symbol, it is desirable to form the beam spot with a circular cross-section. Using a compromise beam spot to accommodate these conflicting requirements on the shape of the beam spot has historically yielded poor results.

It is known to switch between different beam spots by moving a focusing lens radially into and out of the optical path of the laser beam. However, this radial movement only achieves dual focusing, that is, focusing at only two positions, and a large, slow movement is required to move the focusing lens. This large movement increases the size of the arrangement and, in turn, the reader, thereby preventing its ready adoption in lightweight, portable applications.

It is also known in the field of laser beam scanning systems to use micro-electro-mechanical systems (MEMS) to eliminate macroscopic mechanical and electronic components and to replace them with large arrays of miniature scanning elements or mirrors to sweep the laser beam across indicia to be electro-optically read. Such MEMS-based systems reduce complexity, allow increased functionality and compensate for errors or failures in the scanning mirrors.

SUMMARY OF THE INVENTION

Objects of the Invention

One object of this invention is to provide an improved arrangement for and method of controlling a size and shape of a scanning beam spot for utilization in a reader for reading a data-encoded symbol.

Another object of this invention is to provide an arrangement which is compact, lightweight, durable and efficient in construction and operation, and thus is ideally suited for portable hand-held applications.

Features of the Invention

In keeping with these objects and others which will become apparent hereinafter, one feature of this invention resides, briefly stated, in an arrangement for, and a method of, controlling scanning beam spot size and shape and orientation in a reader for electro-optically reading indicia, such as one-and/or two-dimensional bar code symbols.

The invention provides a light source, preferably a laser diode, for emitting a laser beam along an optical axis. The laser beam exiting the laser diode has an initial cross-section in a plane perpendicular to the optical axis. Preferably, the initial cross-section is circular.

In accordance with this invention, a deformable, micro-electro-mechanical system (MEMS) mirror is operative for reflecting the laser beam along an optical path toward the symbol to form a beam spot on the symbol. The MEMS mirror is deformed during reading to change the cross-section of the beam reflected from the MEMS mirror to be different in size and shape and orientation as compared to the initial cross-section of the beam incident on the MEMS mirror. Preferably, the beam spot on the symbol is changed to be elliptical in shape.

A scanner is operative for sweeping the beam spot across the symbol with the MEMS mirror either deformed or not. For example, when the MEMS mirror is not deformed, the beam spot is generally circular and is better suited for reading two-dimensional symbols. When the MEMS mirror is deformed, the beam spot is generally ovoidal and is better suited for reading one-dimensional symbols, or for reading poorly printed or low contrast symbols.

In a preferred embodiment, an upright support is provided for supporting the MEMS mirror above a substrate. A plurality of electrodes is provided on the substrate at opposite sides of the support and below the MEMS mirror. A drive circuit is operative for simultaneously charging the electrodes to generate an electrostatic field between the electrodes and the MEMS mirror, the field being of sufficient strength to deform the MEMS mirror between a generally flat configuration in which the cross-sections of the incident and reflected beams are the same, and a distorted configuration in which the cross-sections of the incident and reflected beams are different and, indeed, the cross-section of the reflected beam is optimized to read either one- or two-dimensional symbols. Depending on the shape of the electrodes, at least one needs to be energized to achieve deformation.

Hence, instead of using electrostatic fields to oscillate a MEMS mirror as is known in the art to sweep a laser beam across indicia to be read, this invention proposes the deformation of a MEMS mirror to change the cross-section of the laser beam that is scanned across the indicia. The size, shape and orientation of the beam spot is thereby changed and optimized.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a schematic diagram of an arrangement in accordance with this invention for use in the reader of FIG. 1;

FIG. 6 is an enlarged top plan view of a modified component of the arrangement of FIG. 2; and FIG. 7 is a sectional view taken on line 7—7 of FIG. 6 in one operative position.

DETAILED DESCRIPTION OF THE PREFERRED EMBODIMENTS

Figure 1:
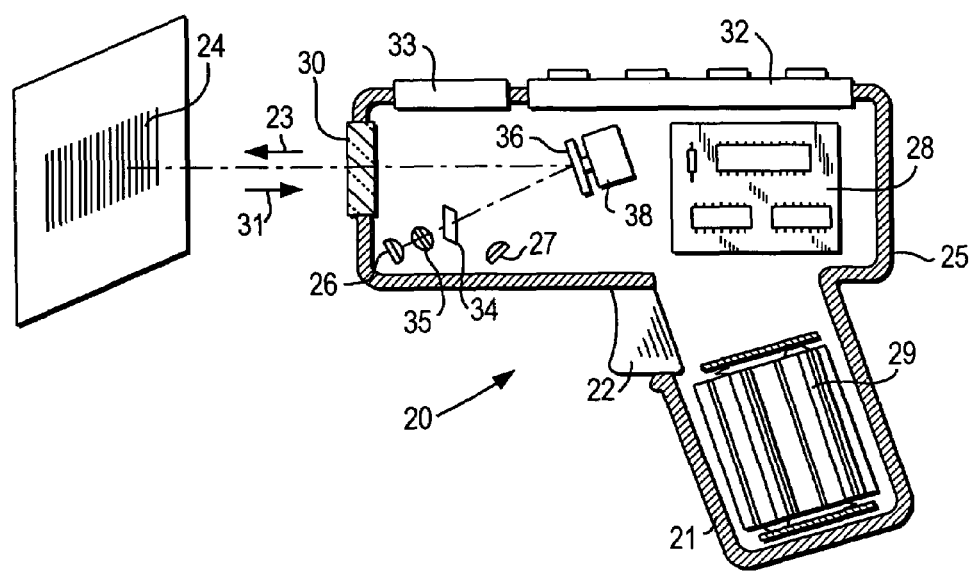
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

In accordance with this invention, a deformable, micro-electro-mechanical system (MEMS) component 40 is positioned in the path of the light beam between the light source 26 and the scan mirror 36 and is deformed by a drive circuit 42 to control the size and shape and orientation of the beam spot on the symbol. Light source 26 is preferably a solid-state laser source, such as a laser diode, for emitting a laser beam along an optical axis 44. As best seen in FIG. 2, the laser beam preferably has a generally circular cross-section 46 as considered in a plane extending perpendicularly of the optical axis 44. The component 40 has an outer reflecting surface and, hence, serves as a mirror 50 for reflecting the incident light beam through the focusing optics 35 along an optical path 48 toward the scan mirror 36 and the symbol 24. After exiting the focusing optics 35, the reflected beam has a cross-section 52 (see FIG. 2) in a plane perpendicular to the optical path 48. As explained below, the cross-section 52 may be circular when the component 40 is undeformed, or preferably ovoidal when the component 40 is deformed.

Figure 4:
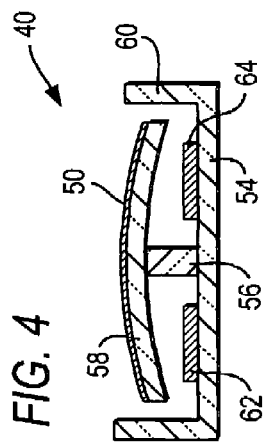
FIG. 4 is a sectional view taken on line 4—4 of FIG. 3 in one operative position.
Figure 5:
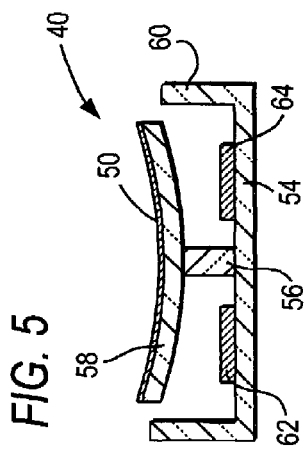
FIG. 5 is analogous to FIG. 4, but in another operative position.
Figure 3:
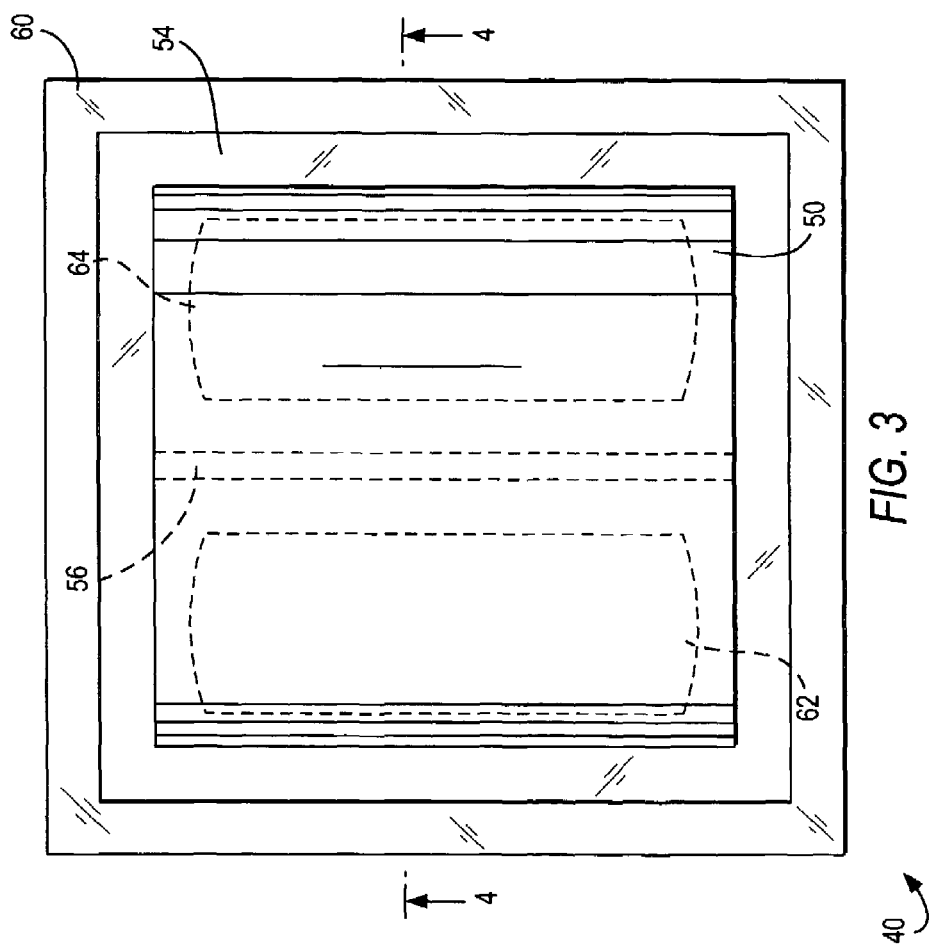
FIG. 3 is an enlarged top plan view of a component of the arrangement of FIG. 2.

Turning to FIGS. 3–5, one embodiment of the MEMS component 40 includes a planar substrate 54, an upright wall support 56 extending perpendicularly of the substrate 54, and a backing 58 on which the mirror 50 is supported. The substrate 54, support 56 and backing 58 are fabricated as an integrated structure made of silicon by using conventional photolithography and patterning and/or well-known surface and bulk micro-machining techniques. The mirror 50 is preferably fabricated as a flash coating of specular material. The support 56 bisects the backing 58 into right and left halves and supports the mirror 50 above the substrate 54. An upstanding frame 60 surrounds the periphery of the substrate.

A pair of electrodes 62, 64 is formed on the substrate 54 underneath the right and left halves of the mirror 50 at opposite sides of the support 56. Each electrode 62, 64 is electrically connected by interconnects to the drive circuit 52 which is operative to provide electrical alternating current to the electrodes. The mirror backing 58 is electrically grounded. By simultaneously charging both electrodes 62, 64 with drive signals of the same polarity, the mirror is deformed from its initial flat configuration to the curved configuration depicted in FIG. 4 and/or FIG. 5 by electrostatic attraction or repulsion between both halves of the mirror and the charged electrodes.

In FIG. 4, the mirror 50 has been deformed into a convex cylindrical shape resembling an inverted letter "U" which converts the circular cross-section 46 of the incident beam to an elliptical cross-section 52 whose major axis extends in one direction across the symbol. In FIG. 5, the mirror 52 has been deformed into a concave cylindrical shape resembling the upright letter "U" which converts the circular cross-section 46 of the incident beam to an elliptical cross-section 52 whose major axis extends in a direction perpendicular to said one direction. If the mirror 50 is not deformed, then the cross-section of the reflected beam will remain circular. In FIG. 4, the right and left halves of the mirror 50 are both simultaneously attracted to the electrodes, whereas in FIG. 5, the right and left halves of the mirror are both simultaneously repelled from the electrodes.

Another embodiment of the MEMS component is identified in FIGS. 6 and 7 by the reference numeral 70. Like parts with the earlier embodiment have been identified with like reference numerals. In contrast to the earlier embodiment of FIGS. 3–5, the support 72 is not a planar wall bisecting the backing 58, but instead is a cylindrical, upright post. In addition, instead of providing two electrodes, one on each side of the support 56, a plurality of electrodes 74 a, b, c, d, e, f, g, h is spaced circumferentially of the post 70. The drive circuit 42 supplies current to selected electrodes simultaneously, thereby allowing for great flexibility in the deformation of the beam and for dynamically changing the ellipticity of the beam spot in virtually any direction.

The material and thickness of the mirror backing, together with the size and location of the electrodes, as well as the strength of the drive signal will determine the extent of mirror deformation.

Rather than relying on the MEMS component to only control the size, shape and orientation of the reflected beam directed to the indicia being read, it is also proposed to use the electrostatic forces in concert with a hinge connected to the MEMS component in order to simultaneously induce the MEMS component to oscillate and thereby sweep the reflected beam across the indicia.

The cross-section of the reflected beam can be changed before or during scanning of the indicia. The beam cross-section can be changed adaptively in response to a particular scanning situation detected by the reader. For example, the signal processing circuitry 28 can detect whether a one- or a two-dimensional symbol is being read and can signal the drive circuit 42 to effect a change in the beam cross-section. Another possibility is to use a predetermined three-dimensional beam profile (x, y, t) in a presentation reader to maintain an elliptical beam profile always orthogonal to the beam path.

Still another use resides in image projection systems which project bit-mapped images. The projection spot can be deformed, in the manner described above, in order to account for the variable spot elongation in the projected field.

It will be understood that each of the elements described above, or two or more together, also may find a useful application in other types of constructions differing from the types described above.

While the invention has been illustrated and described as embodied in an arrangement for and method of controlling the scanning beam spot size and shape and orientation in electro-optical readers, it is not intended to be limited to the details shown, since various modifications and structural changes may be made without departing in any way from the spirit of the present invention. For example, the cross-section of the incident beam need not be circular as illustrated, but could be any cross-section. Also, the cross-section of the reflected beam need not be elliptical as illustrated, but could be any cross-section. Still further, the initial undeformed configuration of the MEMS mirror need not be a flat, planar mirror as illustrated, but could also be a curved mirror which, after deformation, could be flat or have a different curvature. Also, although two electrodes were charged in the preferred embodiment, any number of electrodes can be charged to achieve the desired deformation.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A beam shaping arrangement, comprising:
   a) a light source for emitting a light beam along an optical axis, the light beam having a cross-section in a plane perpendicular to the optical axis;
   b) a drive for scanning a target;
   c) a deformable, micro-electro-mechanical system (MEMS) mirror located between the light source and the drive for reflecting the light beam along an optical path toward the drive as a reflected beam having a cross-section in a plane perpendicular to the optical path; and
   d) means for changing the cross-section of the reflected beam to be different from the cross-section of the light beam emitted by the source by deforming the MEMS mirror between curved configurations, thereby enabling the drive to scan the target with the reflected beam of different cross-section.

2. The arrangement of claim 1, wherein the light source is a solid-state laser.

3. The arrangement of claim 1, and further comprising a substrate and an upright support for supporting the MEMS mirror above the substrate.

4. The arrangement of claim 3, wherein the changing means includes a plurality of electrodes on the substrate at opposite sides of the support and below the MEMS mirror, and a drive circuit for charging the electrodes to generate between the electrodes and the MEMS mirror an electrostatic field of sufficient strength to deform the MEMS mirror.

5. The arrangement of claim 4, wherein the support lies in an upright plane bisecting the MEMS mirror, and wherein the electrodes include a first electrode positioned at one side of the upright plane, and a second electrode positioned at an opposite side of the upright plane, and wherein the drive circuit charges both the first and the second electrodes simultaneously.

6. The arrangement of claim 5, wherein the MEMS mirror has an initial configuration in which the MEMS mirror lies in a plane, and wherein the MEMS mirror has a curved configuration during operation of the changing means.

7. The arrangement of claim 3, wherein the substrate, the support and the MEMS mirror are of one-piece construction.

8. The arrangement of claim 4, wherein the support is an upright post centrally located with respect to the MEMS mirror, and wherein the electrodes are arranged circumferentially about the post, and wherein the drive circuit charges at least one of the electrodes.

9. The arrangement of claim 1, wherein the MEMS mirror is deformed between curved configurations of opposite curvature.

10. The arrangement of claim 1, wherein the changing means deforms the MEMS mirror between a first shape in which the cross-section of the reflected beam has a major axis extending in one direction across the target, and a second shape in which the cross-section of the reflected beam has a major axis extending across the target in a transverse direction perpendicular to said one direction.

11. The arrangement of claim 1, wherein the target is indicia to be electro-optically read, and signal processing circuitry for detecting a type of the indicia being read, and wherein the changing means is responsive to the type of the indicia detected by the signal processing circuitry.

12. The arrangement of claim 1, wherein the cross-section of the light beam emitted by the source is generally circular, and wherein the changing means changes the cross-section of the reflected beam to be elliptical.

13. A beam shaping method, comprising the steps of:
   a) emitting a light beam from a light source along an optical axis, the light beam having a cross-section in a plane perpendicular to the optical axis;
   b) scanning a target with a drive;
   c) positioning a deformable, micro-electro-mechanical system (MEMS) mirror relative to the light beam between the light source and the drive for reflecting the light beam along an optical path toward the drive as a reflected beam having a cross-section in a plane perpendicular to the optical path;
   d) changing the cross-section of the reflected beam to be different from the cross-section of the light beam by deforming the MEMS mirror between curved configurations; and
   e) enabling the drive to scan the target with the reflected beam of different cross-section.

14. The method of claim 13, and the step of supporting the MEMS mirror above a substrate.

15. The method of claim 14, wherein the changing step is performed by positioning a plurality of electrodes on the substrate below the MEMS mirror, and by charging the electrodes to generate between the electrodes and the MEMS mirror an electrostatic field of sufficient strength to deform the MEMS mirror.

16. The method of claim 15, wherein the charging step is performed by simultaneously charging a plurality of the electrodes.

17. The method of claim 16, wherein the changing step distorts the MEMS mirror between a generally planar configuration and a curved configuration.

18. The method of claim 13, wherein the cross-section of the light beam is generally circular, and wherein the changing step is operative to change the cross-section of the reflected beam to be elliptical.

19. The method of claim 13, wherein the changing step deforms the MEMS mirror between a first shape in which the cross-section of the reflected beam has a major axis extending in one direction across the target, and a second shape in which the cross-section of the reflected beam has a major axis extending across the target in a transverse direction perpendicular to said one direction.

20. The method of claim 13, wherein the target is indicia to be electro-optically read, and the step of detecting a type of the indicia being read, and wherein the changing step is responsive to the type of the indicia detected.

* * * * *